United States Patent Office 3,205,186
Patented Sept. 7, 1965

3,205,186
COATING COMPOSITION CONTAINING WAX, POLYOLEFIN, AND ETHYLENE-VINYL ACETATE COPOLYMER
Ralph Zaayenga, Drexel Hill, Pa., assignor to Sun Oil Company, Philadelphia, Pa., a corporation of New Jersey
No Drawing. Filed Mar. 9, 1961, Ser. No. 94,448
11 Claims. (Cl. 260—28.5)

This invention relates to a novel wax composition. It particularly relates to a wax composition containing a major proportion of paraffin wax and minor proportions of polyolefin wax and the copolymer of ethylene and vinyl acetate, the composition being especially suitable for coating fibrous sheets and containers for packaging liquids.

The use of wax to coat fibrous containers for use in packaging liquids is well known in the art. A particularly useful paraffin wax suitable for coating such containers is described and claimed in U.S. Patent No. 2,624,501. However, actual commercial use has disclosed several disadvantages of coatings formed from this wax. Such coatings on fibrous sheet material may develop minute imperfections which impart a serpentine effect to the coating, thereby creating an unsightly appearance, and leakage of packaged liquid materials through the imperfections may develop. A further difficulty of this wax, as has been found, is the tendency of the coatings formed therefrom to fracture and break away from the fibrous material on suffering an impact so that wax "flakes" are present in the packaged liquid. Such flaking action of a wax is highly undesirable because the product is rendered objectionable to ultimate customers.

The tensile strength and flexibility of petroleum waxes has been improved slightly by the addition thereto of polyethylene. However, such wax mixtures are objectionable in that whatever improvement is attained at relatively warm temperatures, say 73° F., is lost when the wax-polyethylene mixture is cooled to a relatively cool temperature, say, 36° F., due, it is thought, to the precipitation of the polyethylene from the wax.

On the other hand, it is known that mixtures of the copolymer of ethylene and vinyl acetate in petroleum waxes produce a wax composition having improved tensile strength and flexibility over mixtures of polyethylene and wax and, in some cases, over petroleum wax itself. However, such mixtures, when formulated for use as a coating composition, have viscosities of extremely high values thereby rendering pumping costs excessive and creating a wax composition from which it is almost impossible to achieve a smooth coating on fibrous materials.

Accordingly, it is an object of this invention to provide a wax composition especially suitable for coating fibrous containers for fluids. A particular object is to provide a wax composition effective for coating paper containers for liquids which imparts a pleasing appearance to the resulting article of manufacture while providing good coverage and good blocking characteristics and which can be readily applied with conventional equipment. A specific object is to provide a wax composition which, when formed as a coating for a fibrous container, will not easily fracture on impact and will have substantially non-flaking characteristics. Another specific object is to provide a means for providing a wax composition having significantly improved non-flaking characteristics but which, at coating temperatures, has significantly lower viscosities. Still another specific object is to provide a container for packaging liquids formed from fibrous sheet material and coated with an adherent non-flaking moisture resistant, primarily wax, coating.

The above and other objects can be obtained by blending the following components: a major proportion of paraffin wax and minor proportions of polyolefin wax and copolymers of ethylene and vinyl acetate.

As used herein, melting points are determined by ASTM D87–57, penetrations by ASTM D1321–57T, and viscosities (SUS, Saybolt Universal Seconds) by ASTM D446–57T, unless otherwise stated. All percentages are weight percent.

The components of the wax composition of the present invention are characterized as follows:

WAX A

This is the paraffin wax component. By paraffin wax is meant the crystalline petroleum products which are removed from distillates or overhead stocks by, say, sweating or solvent extraction. Usually this wax has a melting point between 115° F. and 150° F. It is relatively brittle and consequently is easily fractured. Preferably, however, the paraffin wax component will have a relatively low melting point. A distinctly preferable paraffin wax has a melting point between 125° F. and 132° F., a penetration (at 77° F.) of from 17 to 23, a viscosity (at 210° F.) of from 37 to 41 seconds, and a tensile strength at 40° F. of from 275 p.s.i. to 325 p.s.i., the tensile strength at 40° F. being at least 25 p.s.i. higher than the tensile strength at 70° F. This relatively low melt point paraffin wax may be prepared as follows: A slack wax from the dewaxing of lubrication oil, which may contain about 30% oil, is vacuum distilled and the fraction distilling between about 390° F. and 565° F. at 2 mm. of mercury pressure is collected. This fraction is dissolved in a solvent, preferably a mixture of methyl ethyl ketone and benzene in about equal volumes. Dissolution is performed at an elevated temperature, say, from about 165° F. to 195° F., and advantageously about 6 parts by volume of solvent per part of wax is used. The solution is slowly cooled to a temperature of from 75° F. and 83° F. and the wax which precipitates at this temperature is separated such as by filtration. The solution separated from the precipitated wax is further slowly cooled to a temperature of from 28° F. to 33° F. and the wax which precipitates at this temperature is separated and forms Wax A of the present invention. Preferably, the wax after separation from solution is washed, such as with the solvent employed for dissolution, preferably at the same temperature as used for filtration, namely from 28° F. to 33° F. and the wax is then separated.

POLYOLEFIN WAX

As used herein, the term "polyolefin wax" is intended to include the following: low molecular weight polyethylene, low molecular weight isotactic (crystalline) polypropylene, and copolymers of polypropylene and polyethylene.

The polyethylene wax, designated herein as PE, has a molecular weight between 1000 and 12,000. Further, a suitable PE has a melt point between about 205° F. and 230° F. and a specific gravity between about 0.900 and 0.930. For example, the PE used herein to illustrate the invention has these properties: average molecular weight, 2000; melt point, 219° F. to 226° F. (ASTM E28–51T); hardness, 3 to 5 (ASTM D1321–55T); specific gravity about 0.92; and viscosity at 140° C. of about 180 centipoises.

The polypropylene wax, designated herein as PP, has an average number molecular weight between 1000 and 12,000 and is characterized by a high degree of crystallinity. A particularly suitable PP is described and claimed in U.S. Patent 2,835,659. However, any commercially available PP which is highly crystalline and within the above specified molecular weight range can be used satisfactorily in this invention. Typically, satisfactory PP has a melt point between about 280° F. and 335° F., a specific gravity between about 0.900 and 0.920, and an average molecular weight between about 7000 and 9000.

It is recognized that PP and PE may be copolymerized to a suitable polyolefin wax and used in the wax composition or may be used concurrently as components of said wax composition, or, preferably, may be used separately and individually as a component in said wax composition.

COPOLYMER

The method of copolymerizing ethylene and vinyl acetate is described and claimed in U.S. Patent 2,200,429. Generally, the copolymer or interpolymer is obtained by heating a mixture of ethylene and vinyl acetate at a temperature of 100° C. to 400° C. under a pressure of more than 500 atmospheres. Typically, such copolymers can be prepared by copolymerizing a mixture of ethylene and vinyl acetate in the presence of an oxygen catalyst at pressures of from 15,000 to 30,000 p.s.i.g. and at temperatures of from 150° C. to 250° C.; then, separating the resultant copolymer from unreacted monomers. The composition of the copolymer may be from 5 to 25 moles of ethylene per mole of vinyl acetate with the melt index varying from 0.5 to 1000. Specifically, the copolymer used herein for illustrative purposes contains about 25 weight percent vinyl acetate. As used herein, the symbol for such copolymer is PEVA.

The above specified components in specific combination make up the wax composition of the present invention. The incorporation of these components into the wax composition can be by any convenient means, such as by blending the wax in molten state together with the polymer and copolymer to obtain a homogeneous blend.

The solvent designated in the methods of preparing the wax components may be of the known dewaxing and deoiling solvents. The preferred solvent is a mixture of methyl ethyl ketone and benzene. Either of the components of the solvent may be replaced, however, in whole or in part, by other ketones, such as methyl butyl ketone or acetone, or hydrocarbons or halogenated hydrocarbons such as ethylene dichloride, pentane, hexane, or alcohols such as propyl or the heptyl alcohols.

The Tinius-Olsen angle of fracture test used herein to evaluate the flaking properties of waxes is performed on the Tinius-Olsen Stiffness Tester. The procedure is as follows: Wax is formed into strips of specified dimensions (0.16 inch thick by 0.5 inch wide by 2 inches long) by solidifying molten wax on the surface of water to form the desired thickness, and cutting to the other dimensions. These wax strips are placed on the Tinius-Olsen Stiffness Tester and are evaluated for angle of fracture at 73° F. and at 36° F. This angle of fracture as measured by this apparatus is the angle to which the specimen may be bent without complete fracture.

Thus, it is desirable to formulate a wax composition which will, under test, fracture at a high angle of deformation. An angle of 90° is the maximum deformation that can be measured on this instrument. However, for practical reasons, the maximum angle usually measured is 78°. Therefore, the number 78° should be interpreted as 78° +.

The angle of fracture values at 73° F. and 36° F. are necessary for complete definition of flaking properties of the specimen. However, the angle of fracture at 36° F. is the critical value because this temperature corresponds to the refrigeration temperature to which, say, milk cartons are exposed. The flaking characteristics are evaluated by determining the grams of wax which flake off per 1000 milk cartons of one quart size, after subjecting the milk cartons to the standard drop test. Accordingly, the amount of flaking to be expected from a wax composition has been correlated with the angle of fracture at 36° F. as follows:

| Flaking, grams: | Tinius-Olsen angle of fracture at 36° F. |
|---|---|
| 0 | 19+ |
| 3 | 17 |
| 6 | 15 |
| 14 | 11 |
| 20 | 9 |
| 50+ | 7— |

Actual experience has shown that a wax composition with substantially non-flaking characteristics must have a minimum angle of fracture at 36° F. of 15° and at 73° F., a minimum of 20°. On the other hand, the commercially available waxes of the art, such as the wax described in U.S. Patent No. 2,624,501 will have an angle of fracture at 36° F. of about 7° which represents about 50 grams of wax flaking per 1000 milk cartons of one quart size.

"Non-flaking" as used herein is defined, in general, as applicable to wax compositions which result in wax flaking from 0 to 6 grams of wax per 1000 milk cartons. More particularly, "non-flaking" is applicable to wax compositions having a Tinius-Olsen angle of fracture at 36° F. of from 15° to 50° and at 73° F. of from 20° to 78+°.

The present invention includes wax compositions containing the above-specified components in the following specified ranges:

| Component: | Weight percent concentration range |
|---|---|
| Wax A | 60–90 |
| PEVA | 5–20 |
| Polyolefin | 5–20 |

The preferred composition for the present invention is:

| Component: | Amount |
|---|---|
| Wax A | 76–84 |
| PEVA | 8–12 |
| PE | 8–12 |

An excellent example of the wax composition of the invention is a blend of:

| | Percent |
|---|---|
| Wax A | 80 |
| PEVA | 10 |
| PE | 10 |

The above wax composition had a Tinius-Olsen angle of fracture at 36° F. of 19° and at 73° F. of 29° which according to the above correlation is equivalent to essentially no wax flaking (zero grams) per 1000 milk cartons.

As used herein, a wax composition designated expressly or by omission as containing "zero" oil content includes inherently or additionally, an oil content of less than 1.0%.

*Example 1*

A commercially available copolymer (PEVA) having a mole ratio of ethylene to vinyl acetate of 8 to 1 was blended into the preferred Wax A. Upon solidifying and testing, the following results were obtained:

| Wax A | PEVA | Angle of fracture | |
|---|---|---|---|
| | | 73° F. | 36° F. |
| 100 | 0 | 7 | 5 |
| 98 | 2 | 11 | 6 |

It is noted that PEVA has essentially no effect on the low temperature flaking characteristics of paraffin wax. The benefit obtained at 73° F. (increase from 7° to 11°) is of no practical value when the composition is used to coat milk containers which are refrigerated at approximately 36° F.

Example 2

The following blends illustrate the fact that PEVA, plus a laminating microcrystalline wax having a 153° F. melt point blended into Wax A does not produce a substantially non flaking wax.

| Wax A | PEVA | Micro | Angle of fracture | |
|---|---|---|---|---|
| | | | 73° F. | 36° F. |
| 88 | 2 | 10 | 13 | 8 |
| 83 | 2 | 15 | 13 | 8 |

By comparing with Example 1, it is noticed that the microcrystalline wax component tends to lower the 73° F. angle of fracture and tends to raise the 36° F. angle of fracture.

Example 3

A commercially available PE having a molecular weight of 2000 was blended into the preferred molten Wax A. Upon solidifying and testing the following results were obtained:

| Wax A | PE | Angle of fracture | |
|---|---|---|---|
| | | 73° F. | 36° F. |
| 99 | 1 | 8 | 5 |
| 98 | 2 | 16 | 7 |
| 97.5 | 2.5 | 11 | 6 |
| 89 | 11 | 10 | 5 |
| 80 | 20 | 10 | 6 |

It is concluded from the above that a polyolefin wax blended only with Wax A does not produce a substantially non-flaking wax.

Example 4

The wax composition of Example 1 is repeated but by using increased amounts of PEVA as follows:

| Wax A | PEVA | Angle of fracture | | Viscosity at 210° F., SUS |
|---|---|---|---|---|
| | | 73° F. | 36° F. | |
| 90 | 10 | 78+ | 12 | 277 |
| 80 | 20 | 78+ | 26 | 4,000+ |

From a flaking resistance standpoint, the latter blend is satisfactory in non-flaking quality. But from a viscosity standpoint, the 4000+ seconds is an intolerable viscosity for coating fibrous materials. In many cases, under such conditions the pumping costs would be excessive, the consumption of wax would be excessive, and the coverage, blocking, and appearance would be poor. It is also noted that 10% PEVA is slightly better than 10% PE; but both are of unsatisfactory flaking quality (both would flake more than 14 grams of wax per 1000 cartons).

Example 5

Equal amounts of PE plus PEVA were blended into molten Wax A. Upon solidifying and testing, the following results were obtained:

Wax A _____ 80
PEVA _____ 10
PE _____ 10
Angle of fracture:
    73° F. _____ 29
    36° F. _____ 17
    Viscosity at 210° F., SUS _____ 195

The above wax composition has good flaking resistance, namely, three grams of wax per 1000 cartons. In addition, the viscosity of the blend is actually lower than either composition of Example 4.

Thus, it is concluded from the above examples that substantially non-flaking wax compositions can be blended from 60% to 90% paraffin wax, 5% to 20% polyolefin wax, and 5% to 20% of the copolymer of ethylene and vinyl acetate.

In order to demonstrate to those skilled in the art, the process of controlling the viscosity of substantially non-flaking wax composition during the coating operation on fibrous materials, the following example is shown:

Example 6

| Temp., °F. | Viscosity in cps. | | | |
|---|---|---|---|---|
| | Base blend | 9% PE | 15% PE | 20% PE |
| 290 | 18.0 | 22.6 | 27.0 | ¹ 18.1 |
| 285 | 19.2 | 21.9 | 27.5 | 23.0 |
| 280 | 20.3 | 23.8 | 28.5 | 25.3 |
| 275 | 21.0 | 25.5 | ¹ 29.3 | 25.7 |
| 270 | 22.1 | 25.5 | 30.0 | 26.7 |
| 265 | 23.4 | 26.1 | 29.5 | 25.4 |
| 260 | 25.0 | 29.8 | 30.3 | 26.0 |
| 255 | 25.9 | 30.0 | 30.6 | 28.5 |
| 250 | 27.4 | 30.9 | 28.1 | 27.7 |
| 245 | 28.5 | 31.9 | 28.6 | 31.0 |
| 240 | 31.0 | 34.5 | 29.0 | 29.3 |
| 235 | 32.6 | 37.0 | 29.7 | 29.1 |
| 230 | 34.1 | ¹ 39.1 | 29.8 | 30.6 |
| 225 | 35.6 | 39.7 | 31.0 | 31.2 |
| 220 | 38.2 | 40.0 | 30.9 | 33.7 |
| 215 | 40.6 | 39.3 | 31.4 | 33.2 |
| 210 | ¹ 45.6 | 39.5 | 33.0 | 36.5 |
| 205 | 46.1 | 40.0 | 33.0 | 39.0 |
| 200 | 44.5 | 40.1 | 34.7 | 39.5 |
| 195 | 42.0 | 40.6 | 35.8 | ------ |
| 190 | 40.2 | 42.0 | 46.0 | ------ |

Note: (1) ¹ Indicates the cloud point.
(2) Base blend is 90% Wax A and 10% PEVA.

It is noted that in the range of temperatures from 195° F. to 240° F. (within which the usual coating operations are performed), it is possible to choose the amount of PE to be added so that the resulting viscosity is appreciably lower than that of the base blend. For example, at 225° F. the base blend viscosity was 35.6 centipoises; adding thereto 9% PE actually raised the viscosity to 39.7 centipoises; but adding thereto 15% PE (the base contains 10% PEVA) the viscosity dropped significantly to 31 centipoises.

Therefore, from the above, those skilled in the art will recognize that in the preparation of a substantially non-flaking wax composition for use in coating liquid containers comprising essentially paraffin wax having a melt point between 125° F. and 132° F.; viscosity at 210° F. of between 37 and 41 seconds; and a tensile strength at 40° F. of from 275 p.s.i. to 325 p.s.i., the tensile strength at 40° F. being at least 25 p.s.i. higher than the tensile strength at 70° F.; and the copolymer of ethylene and vinyl acetate, the present invention teaches the improvement which comprises admixing additionally thereto relatively low molecular weight polyethylene to produce a blend having a Tinius-Olsen angle of fracture at 36° F. of at least 15°; and at 73° F. of at least 20°; and having a viscosity less than the viscosity of said wax composition; said viscosity being measured at a temperature between 195° F. and 240° F. and the proportions of the ingredients being such that the resulting three component blend contains, based on the weight of said blend, 60–90% paraffin wax, 5–20% of the copolymer of ethylene and vinyl acetate, and 5–20% polyethylene.

On storing wax slabs prepared from the composition of the present invention for long periods of time under ambient temperature conditions, which includes a temperature of about 90° F., no blocking of the slabs is observed.

The present wax composition is primarily intended for use in coating fibrous fluid containers, particularly cardboard milk containers, which may be advantageously accomplished by dipping or spraying the containers in or with molten wax. The present wax composition may be used in many other applications, especially where high tensile strength and low temperature flexibility and adherence is desirable, such as in the coating of metal fluid containers, canvas impregnation, coating paper drinking cups, adhesive formulations, i.e., coating packaging materials in general.

Furthermore, it is recognized that the wax compositions of the present invention may have added thereto various additives, such as anti-oxidants in amounts ranging from 0.0015% to 2%. Certain amides may also be incorporated to, for example, reduce frictional drag of a wax coated milk carton moving through conventional packaging equipment.

I claim:

1. A substantially non-flaking wax composition consisting essentially of 76–90% of a paraffin wax having a melting point between 115° F. and 150° F., 5–12% of the copolymer of ethylene and vinyl acetate containing 5–25 moles of ethylene per mole of vinyl acetate, and 5–12% of a polyolefin wax selected from the group consisting of polyethylene having a molecular weight between 1000 12,000, isotactic polypropylene having a molecular weight between 1000 and 12,000, and the copolymer of ethylene and propylene.

2. A wax composition according to claim 1 wherein said polyolefin wax is polyethylene.

3. A wax composition according to claim 2 wherein said paraffin wax has a melting point between 125° F. and 132° F., a viscosity at 210° F. of from 37 to 41 seconds, and a tensile strength at 40° F. of from 275 p.s.i. to 325 p.s.i., the tensile strength at 40° F. being at least 25 p.s.i. higher than the tensile strength at 70° F.

4. A container for packaging liquids formed from fibrous sheet material and provided with an adherent, substantialy non-flaking, moisture resistant coating, said coating being a wax composition according to claim 2.

5. A wax composition according to claim 2 wherein the amount of the copolymer of ethylene and vinyl acetate is about 10% and wherein the amount of polyethylene wax is about 10%.

6. A wax composition according to claim 1 wherein the amount of the copolymer of ethylene and vinyl acetate is about 10% and wherein the amount of polyolefin wax is about 10%.

7. In the preparation of a substantially non-flaking wax composition for use in coating containers for liquids, said composition consisting essentially of paraffin wax and the copolymer of ethylene and vinyl acetate the improvement which comprises admixing additionally therewith a viscosity reducing proportion of a polyolefin wax to produce a blend having a Tinius-Olsen angle of fracture at 36° F. of at least 15°; and at 73° F. of at least 20°, said polyolefin wax being selected from the group consisting of polyethylene, polypropylene, and the copolymer of ethylene propylene, and said viscosity being measured at a temperature between 195° F. and 240° F., and the proportions of the ingredients being such that the resulting three component blend contains, based on the weight of said blend, 60–90% paraffin wax, 5–20% of the copolymer of ethylene and vinyl acetate, and 5–20% polyolefin wax.

8. Process according to claim 7 wherein said polyolefin wax is polyethylene.

9. Process according to claim 8 wherein the amount of polyethylene is 5–12%.

10. Process according to claim 8 wherein said paraffin wax has a melting point between 125° F. and 132° F., a viscosity at 210° F. of from 37 to 41 seconds, and a tensile strength at 40° F. of from 275 p.s.i. to 325 p.s.i., the tensile strength at 40° F. being at least 25 p.s.i. higher than the tensile strength at 70° F.

11. Process according to claim 7 wherein the resulting three component blend contains 76–90% paraffin wax, 5–12% copolymer, and 5–12% polyethylene.

References Cited by the Examiner

UNITED STATES PATENTS

| | | | |
|---|---|---|---|
| 2,638,459 | 5/53 | Bowman et al. | 260—28.5 |
| 2,728,735 | 12/55 | Anderson | 260—28.5 |
| 2,877,196 | 3/59 | Reding | 260—28.5 |

MORRIS LIEBMAN, *Primary Examiner.*

MILTON STERMAN, *Examiner.*